United States Patent
Nojoumian (10) Patent No.: US 12,240,376 B2
(45) Date of Patent: Mar. 4, 2025

(54) ACTIVE OCCUPANT STATUS AND VEHICLE OPERATIONAL STATUS WARNING SYSTEM AND METHODS

(71) Applicant: Florida Atlantic University Board of Trustees, Boca Raton, FL (US)

(72) Inventor: Mehrdad Nojoumian, Boca Raton, FL (US)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 373 days.

(21) Appl. No.: 17/542,807

(22) Filed: Dec. 6, 2021

(65) Prior Publication Data

US 2022/0179432 A1 Jun. 9, 2022

Related U.S. Application Data

(60) Provisional application No. 63/123,100, filed on Dec. 9, 2020.

(51) Int. Cl.
| | |
|---|---|
| *B60Q 1/50* | (2006.01) |
| *B60N 2/00* | (2006.01) |
| *B60N 2/26* | (2006.01) |
| *B60N 2/28* | (2006.01) |
| *G05D 1/00* | (2006.01) |
| *H04L 67/12* | (2022.01) |

(52) U.S. Cl.
CPC ......... *B60Q 1/5037* (2022.05); *B60N 2/0021* (2023.08); *B60N 2/266* (2023.08); *B60N 2/267* (2023.08); *B60N 2/28* (2013.01); *G05D 1/0276* (2013.01); *H04L 67/12* (2013.01); *B60N 2210/40* (2023.08)

(58) Field of Classification Search
CPC ............................ B60Q 1/5037; B60N 2/002; B60N 2002/981; B60N 2/28; G05D 1/0276; H04L 67/12
See application file for complete search history.

(56) References Cited

U.S. PATENT DOCUMENTS

| | | |
|---|---|---|
| 5,949,340 A | 9/1999 | Rossi |
| 6,922,147 B1 * | 7/2005 | Viksnins ............ G08B 21/0208 340/522 |
| 7,012,533 B2 | 3/2006 | Younse |

(Continued)

*Primary Examiner* — Aryan E Weisenfeld
*Assistant Examiner* — Dominick Mulder
(74) *Attorney, Agent, or Firm* — FOX ROTHSCHILD LLP (57) ABSTRACT

Systems and methods including at least one internal sensor attached internally to a vehicle, at least one external sensor mounted externally to the vehicle, wherein the external sensor detects at least one of a distance of other vehicles, a speed of other vehicles, driving patterns of other vehicles, and weather conditions; and at least one display configured to receive input from the internal sensor and the at least one external sensor, wherein the at least one display notifies a driver of an adjacent vehicle and/or a system controlling an adjacent manually-driven, semi-autonomous, or self-driving car of at least one of the occupation status of the vehicle, operational status of the vehicle, weather conditions, changing driving behaviors, when the adjacent vehicle exceeds a speed threshold, and/or when the distance between the vehicle and the adjacent vehicle falls below a minimum separation distance.

16 Claims, 4 Drawing Sheets

(56) References Cited

U.S. PATENT DOCUMENTS

| | | |
|---|---|---|
| 7,095,318 B1 | 8/2006 | Bekhor |
| 9,266,471 B2 | 2/2016 | Schoenberg et al. |
| 11,498,500 B1* | 11/2022 | Pertsel ................. B60N 2/0244 |
| 2002/0084891 A1* | 7/2002 | Mankins ................. B60Q 1/545 |
| | | 340/425.5 |
| 2005/0046584 A1* | 3/2005 | Breed ................... G06F 3/0237 |
| | | 340/13.31 |
| 2008/0319697 A1* | 12/2008 | Gray ...................... B60N 2/002 |
| | | 702/98 |
| 2009/0027188 A1* | 1/2009 | Saban ................... B60N 2/002 |
| | | 340/439 |
| 2009/0234542 A1* | 9/2009 | Orlewski ............. B60N 2/0026 |
| | | 701/45 |
| 2010/0268423 A1* | 10/2010 | Breed ................... B60N 2/002 |
| | | 701/45 |
| 2011/0098911 A1* | 4/2011 | Ellanti ................... G08G 1/167 |
| | | 715/764 |
| 2015/0283939 A1* | 10/2015 | Parkes .................. B60Q 1/544 |
| | | 340/468 |
| 2016/0101729 A1* | 4/2016 | Burke ................... B60W 50/14 |
| | | 701/36 |
| 2018/0022231 A1* | 1/2018 | Bennett .................. B60N 2/002 |
| | | 324/686 |
| 2018/0118099 A1* | 5/2018 | Kunii .................... H04N 9/3179 |
| 2018/0170213 A1* | 6/2018 | Lu-Dac ................. A61B 5/6893 |
| 2018/0188061 A1* | 7/2018 | Yamamoto ......... G01C 21/3697 |
| 2019/0130874 A1* | 5/2019 | Wafford ................. G09G 5/373 |
| 2019/0344738 A1* | 11/2019 | Ga ......................... B60N 2/002 |
| 2019/0377359 A1* | 12/2019 | Lanke ................ G01C 21/3641 |
| 2020/0118409 A1* | 4/2020 | Yang ....................... G08B 21/22 |
| 2020/0223352 A1* | 7/2020 | Toshio Kimura ...... B60Q 1/547 |
| 2020/0242421 A1* | 7/2020 | Sobhany ................. B60W 50/08 |
| 2020/0309361 A1* | 10/2020 | Mourou ................. F21V 29/505 |
| 2020/0333791 A1* | 10/2020 | Inoue ................. G01C 21/3492 |
| 2020/0334453 A1* | 10/2020 | Thomas ............ B60R 21/01526 |
| 2020/0353940 A1* | 11/2020 | Kim ....................... B60N 2/002 |
| 2020/0367035 A1* | 11/2020 | Lee ......................... H04W 4/70 |
| 2020/0391756 A1* | 12/2020 | Wang ..................... B60W 10/04 |
| 2021/0116256 A1* | 4/2021 | Konrardy ............. G06Q 50/265 |
| 2021/0197846 A1* | 7/2021 | Thakur .................. G01S 17/931 |
| 2021/0229703 A1* | 7/2021 | Domeyer ............. G05D 1/0276 |
| 2022/0013045 A1* | 1/2022 | Takeda .................. B60K 35/81 |
| 2022/0281381 A1* | 9/2022 | Clochard ............... G08G 1/005 |

* cited by examiner

ACTIVE OCCUPANT STATUS AND VEHICLE OPERATIONAL STATUS WARNING SYSTEM AND METHODS

BACKGROUND OF THE INVENTION

1. Field of Invention

This invention relates to systems and methods for monitoring and reporting on the status of vehicles, and more particularly to systems and methods for notifying drivers and systems controlling self-driving cars of occupant and operational status of a vehicle.

2. Description of Related Art

Motor vehicle injuries are a leading cause of death among children. While car seat use reduces the risk of injury to a child in a motor vehicle accident by approximately 71-82%, more than 97,000 children were injured in motor accidents in the United States in 2018. To effectively reduce this growing number of injuries, there is not only a need for the use of child car seats, but also apparatus and methods to encourage other drivers to operate vehicles in a safer manner around vehicles carrying children and other vulnerable populations, such as the elderly and disabled.

The prior art has sought to develop products to enhance child safety within motor vehicles. Particularly, the use of warning systems and car seat safety devices are known in the prior art. While stationary signs have been used to alert others when a child is in a vehicle, these signs are often left on the window of the vehicle even when a child is not present. As a result, drivers have become desensitized to stationary signs and do not change their driving habits around vehicles displaying them. To incentivize other drivers to improve their driving behaviors, there is a need to indicate when a child is present in a vehicle in a way that drivers will quickly recognize.

U.S. Pat. No. 5,949,340 A to Rossi discloses an apparatus for warning when a child has been left in an infant seat and a vehicle has been turned off. Rossi discloses using means for detecting when an infant is seated in the infant seat and whether a vehicle is on or off. The apparatus disclosed in Rossi also comprises an alarm system which alerts parents and/or passers-by when an infant has been left unattended in the vehicle. However, Rossi's '340 patent does not disclose the presence of a child or other occupant in the vehicle when the vehicle's ignition system has been turned on and the vehicle is moving.

Similarly, U.S. Pat. No. 7,012,533 B2 to Younse discloses a system to detect and notify others when a child is abandoned in a vehicle. The system of the Younse '533 patent is enabled when the vehicle doors are closed and there is a child seated in the car seat. The Younse patent discloses a car seat having a pressure switch to detect when a child is present in the car seat. Younse additionally discloses a temperature sensor and internal and/or external alarms to indicate when a child is left in the car seat when the vehicle's ignition is turned off. While the system disclosed in Younse addresses the common problem of young children being left unattended in high temperature environments, Younse does not remedy the problem of child injury resulting from vehicular accidents occurring while the car is moving. Particularly, Younse does not disclose a display to alert other drivers when a child or other occupant is present in a moving vehicle, but rather utilizes alarms to alert passers-by when a child is left unattended in a stationary vehicle.

U.S. Pat. No. 9,266,471 B2 discloses a child car seat and notification device comprising a sensor integral with the car seat, an accelerometer, a notification system, and a controller. When the device of the '471 patent detects that the vehicle is moving and a child is present in the car seat, the notification system is not activated. The disclosed controller releases a first notification if the vehicle is moving, and the car seat sensor detects that a child is not present in the vehicle. The controller also releases a second notification if the vehicle is not moving and a child is present in the vehicle to alert the child's parent that the child is still present in the vehicle. While the '471 patent does enhance child safety within a vehicle, the disclosed device does not remedy the problem of encouraging other drivers to operate vehicles more safely when an occupant belonging to a vulnerable population is present in a vehicle.

Finally, U.S. Pat. No. 7,095,318 B1 discloses a vehicle advisory system to advise other drivers of actions taken by the vehicle's driver. The system comprises a series of front, rear, side, and interior window systems, wherein each system comprises a multiplicity of words which are "STOP, HELP, SLOWING DOWN, LEFT TURN, RIGHT TURN, REVERSE, and U-TURN." The pertinent word display is activated when the driver presses on the brake, initiates the turn signal, or engages in another activity triggering the relevant word to display. The window systems also comprise a series of lights which may be solid, flashing, or different colors to correspond with the driver's actions. While the '318 patent utilizes an advisory system in a moving vehicle, the '318 patent does not disclose a system to specifically alert drivers when a particular occupant—such as a child, elderly person, or disabled person—is on board the vehicle.

Thus, there is a long-felt need for systems and methods to advise drivers of when vulnerable occupants such as children, the elderly, or disabled people are inside a moving vehicle. Particularly, there is a need to alert other drivers when they are driving too close to a vehicle containing a vulnerable occupant or driving at excessive speeds in proximity to a vehicle containing a such an occupant. Further, there is a necessity to communicate to other vehicles and drivers about specific driving patterns and/or weather conditions to enhance safe driving practices and protect vehicle occupants.

All references cited herein are incorporated herein by reference in their entireties.

BRIEF SUMMARY OF THE INVENTION

A first aspect of the invention accordingly comprises a method for detecting and reporting occupant and operational status of a first vehicle, said method comprising the steps of: detecting a presence of at least one occupant within the first vehicle; classifying the at least one occupant in at least one classification; and reporting the at least one classification to at least one person outside the vehicle and/or at least one other vehicle.

In certain embodiments, the at least one classification is selected from the group consisting of a disabled human, an elderly human of at least 65 years of age, and a human child of less than 5 years of age.

In certain embodiments, the classifying step comprises the driver manually inputting into a display control device the at least one classification of the at least one occupant.

In certain embodiments, the classifying step comprises determining with an internal sensor that a seat in the first vehicle is occupied.

In certain embodiments, the internal sensor is electrically coupled to the first vehicle.

In certain embodiments, the internal sensor is electrically coupled to a child car seat.

In certain embodiments, the reporting step comprises reporting information from the internal sensor to at least one display.

In certain embodiments, the method further comprises detecting external conditions surrounding the first vehicle with an external sensor.

In certain embodiments, the method further comprises activating at least one external display when the external sensor reports that the external conditions surrounding the first vehicle have met a specified standard, wherein the specified standard is selected from a group comprising an adjacent vehicle falling below a minimum separation distance from the first vehicle, an adjacent vehicle exceeding a specified speed threshold, or weather changing to inclement conditions.

In certain embodiments, the method further comprises: detecting driving behavior with an internal sensor, reporting information from the internal sensor to a transmitter located in the first vehicle, and communicating the information from the transmitter located in the first vehicle to a receiver located in a second vehicle.

In certain embodiments, the receiver activates an internal display in the second vehicle and/or adjusts the mechanical function of the second vehicle.

In certain embodiments, the second vehicle is selected from the group consisting of a manually operated vehicle, semi-autonomous vehicle, or self-driving vehicle.

A second aspect of the invention comprises a system for detecting and reporting occupant and operational status of a first vehicle, said system comprising: an occupant detector; at least one external sensor; at least one display device; and at least one display control device configured to modify content displayed on the at least one display device in response to the occupant detector and at least one external sensor.

In certain embodiments of the system, the at least one display control device permits a user to manually enter occupant information.

In certain embodiments of the system, the occupant detector comprises at least one internal sensor.

In certain embodiments of the system, the at least one internal sensor comprises at least one of a pressure sensor, a movement sensor, an infrared sensor, a sound detection device, a facial recognition sensor, an iris recognition sensor, and a fingerprint sensor.

In certain embodiments of the system, the at least one external sensor comprises at least one of a thermometer, a barometer, a wind sensor, a speedometer, an accelerometer, a magnetometer, a capacitive displacement sensor, a radar sensor, a Doppler effect sensor and a Hall-effect sensor.

In certain embodiments of the system, the at least one display device comprises at least one of a head-up display, bulb lighting, an electroluminescent (ELD) display, a liquid crystal (LCD) display, a light-emitting diode (LED) display, a quantum dot (QLED) display, an OLED display, a thin-film transistor display (TFT), a segment display, a laser display, and a digital light processing display.

In certain embodiments of the system, the at least one display device alters at least one of an illumination density, color, or display message in response to input from at least one of the occupant detector and at least one external sensor.

In certain embodiments, the system further comprises a transmitter and a receiver, wherein the transmitter communicates information to the receiver regarding at least one of an occupant status, vehicle operation status, weather conditions, traffic patterns, vehicle location, vehicle speed, and roadway hazards.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF PREFERRED EMBODIMENTS OF THE INVENTION

The invention provides a system and method to report the occupant and operational status of a vehicle. Preferred embodiments of the invention are particularly well-suited for detecting and reporting when an occupant belonging to a vulnerable population is in the vehicle, when adjacent vehicles are driving too close to the vehicle or at excessive speeds, when the driver of the vehicle changes driving behaviors, or when inclement weather changes the road conditions surrounding the vehicle.

The inventive method comprises detecting a presence of at least one occupant within a first vehicle, classifying the at least one occupant in at least one classification, and reporting the at least one classification to at least one person outside the vehicle and/or at least one self-driving vehicle which is not the first vehicle.

The at least one occupant may comprise, and be classified as, any mammal, including a human or non-human animal, such as, e.g., a dog or a cat. Preferably, the method and system of the invention enable detecting, classifying, and reporting whether a vulnerable occupant is inside the vehicle, such as a child, elderly person, or disabled person. Additionally, the at least one occupant may be a driver or passenger.

The at least one occupant is classified in the classifying step into one or more class(es). In preferred embodiments, occupants are classified by age, size and/or mobility. Non-limiting examples of classifications include children (e.g., a child under the age of one, two, three, four or five), teenager, elderly person (e.g., a person over the age of 65, 70, 75 or 80), disabled person (e.g., a person missing all or part of at least one limb, or a person requiring assistance to enter or exit the vehicle), or whether the occupant is the driver or passenger of the vehicle.

The vehicle is preferably any land-based transportation means, such as, e.g., a coupe, sedan, sports utility vehicle (SUV), truck, or commercial vehicle. In other embodiments, the vehicle can be a boat or a plane, but is not limited to such.

In certain embodiments of the invention, an internal sensor is used to detect occupants and their characteristics to classify them. The internal sensor may utilize various methods of detection and classification, including but not limited to facial recognition, iris recognition, fingerprint recognition, infrared technology, pressure switches, voice recognition, or movement sensors. As a nonlimiting example, the internal sensor may utilize facial recognition camera-based sensors to recognize features of the face, including but not limited to hair color and wrinkles within the skin to determine that a passenger is elderly. In other nonlimiting examples, the internal sensor may be electrically coupled to the vehicle to permit the system to be embedded in new vehicles. In other nonlimiting examples, the internal sensor may also be removably attached to the vehicle, allowing for the system to be installed into any pre-existing vehicle. As a further example, the internal sensor may be electrically coupled to a child car seat to detect when a child is present in the seat. The internal sensor may report information to at least one of an internal display, or external display, or the vehicle itself. Reports to displays can be direct or through an intermediate processor which analyzes the information detected and then prompts the displays to display appropriate messaging.

The invention may further comprise reporting information from the internal sensor to at least one internal display. The internal display may include forms including but not limited to being embedded into the vehicle, a removably attachable screen, or a head-up display in which information is projected onto the driver's windshield in an inward-facing fashion readable by the driver. The internal display may also include a pre-existing screen in a vehicle, such as a dashboard display. Moreover, the invention may further include reporting information from the internal sensor to at least one external display, which may comprise a removably attachable screen, an embedded display, or a head-up display in which information is projected onto surfaces including but not limited to the rear-facing window, side windows, or windshield of the vehicle in an outward-facing fashion readable by other drivers on the road. For example, if a child is present in the vehicle, the internal sensor may report information to an internal head-up display reminding a driver that a child is present in a vehicle as well as an external head-up display alerting other drivers that the first vehicle is carrying a child.

In addition to (or instead of) using automated internal sensors, the invention may further include a feature permitting the driver of the vehicle to manually input the classifications of occupants in the vehicle, such as by pressing a button or typing in information to a display control device.

Moreover, the invention may include detecting the external conditions surrounding the first vehicle with an external sensor. The external sensor may comprise features including but not limited to a thermometer, barometer, wind sensor, speedometer, accelerometer, magnetometer, capacitive displacement sensor, radar sensor, or Hall-effect sensor to detect changing weather conditions, the proximity and speed of adjacent vehicles, or whether the first vehicle is slowing down, speeding up, stopping, or turning. In certain nonlimiting examples, the external sensor may report information to at least one internal display or external display, wherein the at least one internal display or external display will communicate a display message corresponding to conditions detected by the external sensor once a particular standard is met, including but not limited to an increase in the severity of inclement weather, if the vehicle's driver is changing driving behavior, or if the distance of an adjacent vehicle falls below a minimum separation distance form the first vehicle or if the adjacent vehicle is exceeding the posted speed limit. In other nonlimiting examples, the at least one external display may also adjust in response to information reported by the external sensor. For example, if the external sensor detects that a large commercial vehicle is behind the first vehicle requiring a longer stop-time than a sedan, the external sensor may report data on the size, speed, and separation distance of the commercial vehicle to the at least one external display. The at least one external display may communicate a display message to "PLEASE SLOW DOWN" and "PLEASE MAINTAIN DISTANCE" earlier in time for such larger vehicles to account for an increased stop time if a sudden stop was necessary. As a further nonlimiting example, the at least one external display may change its illumination density based on light and weather conditions; particularly, if fog is present, the at least one external display may increase its illumination density and change color from white to amber or red lighting for increased visibility.

In additional nonlimiting examples, the at least one external sensor may also communicate information to the first vehicle itself, rather than its driver or to an external display. Particularly for semi-autonomous or self-driving cars, the information reported by the external sensor may affect a change in the vehicle's driving patterns, such as causing the vehicle to slow down and activate four-wheel drive in icy conditions. In such an embodiment of the invention, the invention may further include a transmitter within the first vehicle, wherein the transmitter receives information from the external sensor and communicates information to a second vehicle equipped with a receiver. Multiple vehicles may be equipped with both transmitters and receivers and transmit information amongst a local network, permitting a driver of the first vehicle or the system controlling a self-driving vehicle to become aware if a nearby vehicle experiences or is about to experience a change that meets a specified standard, including but not limited to suddenly slowing down, stopping, or becoming involved in an accident.

As an example of a preferred embodiment of the invention, the invention may alert drivers of when a child is inside a moving vehicle, including but not limited to if other drivers are driving too close to a vehicle containing a child or driving at excessive speeds in proximity to a vehicle containing a child in a child car seat.

The child car seat can be permanently or removably installed in a vehicle and secured to the vehicle's existing seats. The child car seat may be configured to securely hold an infant, toddler, or young child in the form of an infant carrier, toddler car seat, or booster seat. The child car seat may be attached to the seat of the vehicle by securing the car seat to the preexisting seatbelt straps, securing via the LATCH system, or other similar means. Further, the child car seat comprises a seat belt for securing the child, which may comprise a full-body harness, lap belt, or cross-body belt to hold the child safely in the seat.

The system preferably includes an internal sensor configured to detect when a child is present in the child car seat. The internal sensor may comprise a pressure-switch, movement sensor, infrared sensor, sound detection device, and/or other comparable device configured to detect when a child is seated in the child car seat.

The system preferably includes at least one external sensor mounted externally to the vehicle, wherein the external sensor detects at least one of a distance and a speed of other vehicles. The external sensor may comprise a speedometer, infrared sensor, magnetometer, Doppler effect sensor, accelerometer, capacitive displacement sensor, radar sensor, Hall-effect sensor, or other sensor configured to detect at least a speed and/or distance of an adjacent vehicle. The external sensor may be mounted to locations including but not limited to the roof, front, rear, or sides of a vehicle at an attachment point including but not limited to a window, bumper, door, running board, hood, grille, luggage rack, sideview mirror, tailgate, or other part of the vehicle. The external sensor may further be secured via adhesive, suction, straps, magnets, fasteners, screws, ties, or other similar securing mechanisms.

The system preferably comprises at least one display configured to receive input (directly or indirectly via a processor) from the car sensor and the at least one external sensor, wherein the display notifies other drivers and/or the systems controlling their self-driving cars when their vehicle exceeds a speed threshold or when the distance between the driver's vehicle and the vehicle containing a child falls below a minimum separation distance. The display may comprise bulb lighting, electroluminescent (ELD) display, liquid crystal (LCD) display, light-emitting diode (LED) display, quantum dot (QLED) display, OLED display, thin-film transistor display (TFT), segment display, laser display, digital light processing display, or other electronic displays. The display may be mounted internally or externally on the vehicle so that the display is visible to other drivers. The display may be mounted via adhesive, suction, straps, magnets, fasteners, screws, ties, or other similar securing mechanisms.

In certain nonlimiting examples, when the internal sensor detects the presence of a child in the vehicle, the at least one display alerts those outside the vehicle that a child is present in the vehicle. The alert may be in forms including but not limited to words, symbols, and/or lights to advise other drivers that there is a child on board the vehicle. The internal sensor may be configured to alert others to a child's presence in the vehicle only when the vehicle is moving or when the vehicle is both moving and stationary.

In other nonlimiting examples, when the at least one external sensor detects that another vehicle is in close proximity or is exceeding a specific speed threshold, the at least one display may be configured to alert other drivers that their vehicles are too close and/or is driving too fast in the presence of the child-carrying vehicle. The at least one display may utilize words, symbols, or lights to alert other drivers. Further, the display may show a static image, use specific colors of lights, illuminate different portions of the display, and/or flash to draw attention to its message. The at least one display may notify drivers of excessive speed when nearby drivers exceed a specific speed threshold, such as the posted speed limit. The at least one display may also notify other drivers when they fall below a minimum separation distance, which may be a desired distance programmed by the driver with the baby on board, the distance required to give other drivers a predetermined amount of time to stop their vehicles before hitting the child-carrying vehicle's rear at the current speed, a designated amount of car-lengths between vehicles, or other distance.

In further nonlimiting examples, the system may use machine learning techniques to improve performance of the system over time. Machine learning techniques may include but are not limited to supervised learning, unsupervised learning, semi-supervised learning, and reinforcement learning. Machine learning techniques may be implemented for uses including but not limited to detecting when a vulnerable occupant is in the vehicle, analyzing external conditions—such as weather, the presence and size of surrounding vehicles, the speed of other vehicles, or driving behaviors of other drivers. In other nonlimiting examples, machine learning techniques may be used to evaluate the behavior of other drivers in response to the vehicle driver's driving behavior. Machine learning techniques may be used for human-driving or self-driving vehicles. In certain examples, the classifying step includes implementing machine learning to the at least one occupant in at least one classification, including but not limited to a disabled human, an elderly human of at least 65 years of age, or a human child of less than 5 years of age. In certain examples, the receiver may use machine learning techniques to evaluate data from sources including but not limited to at least one internal sensor and/or at least one external sensor and enhance the performance of functions including but not limited to the classifying step, exchanging information between the transmitter and the receiver, detecting changes in the vehicle's internal or external environment, or responding to changes in the vehicles internal or external environment. In a nonlimiting example, a receiver implements machine learning to process data regarding a second vehicle's response to the first vehicle's display message to enhance the accuracy of warnings. In another nonlimiting example, the receiver implements machine learning to improve the vehicle's response to weather-related road conditions, such as ice-covered roads. Machine learning may be used by the receiver to enhance the accuracy of warnings to the driver or other vehicles appearing on the at least one display device or alter the behavior of a semi or fully-autonomous vehicle.

Figure 1:
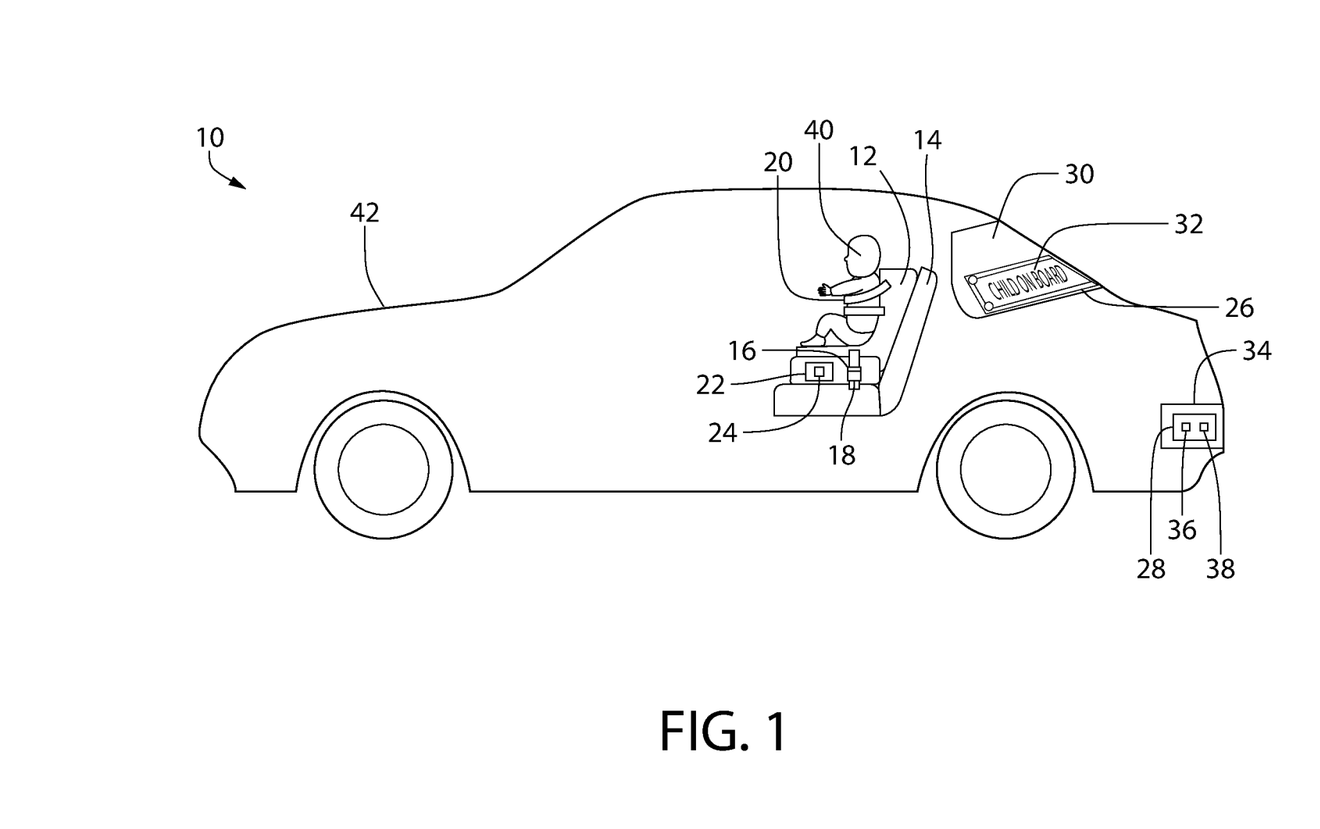
FIG. 1 is a schematic side view of a vehicle in which an embodiment of the system of the invention is installed.

Referring to the figures, FIG. 1 illustrates a preferred embodiment of the system 10 in accordance with the invention. Child car seat 12 is attachable to seat 14 of vehicle 42 via an attachment point 16 which secures child car seat 12 to seat belt 18 of vehicle 42. Child car seat 12 also comprises its own car seat safety belt 20 to safely secure child 40 therein. Further, child car seat 12 contains internal sensor 22, which comprises pressure switch 24. Pressure switch 24 detects the weight of child 40 in child car seat 12, prompting internal sensor 22 to deliver a signal to display 26.

Display 26 is mounted to vehicle 42 as is external sensor 28. Display 26 is mounted internally to vehicle window 30 via suction to be easily repositioned and faces in an external direction to be visible to other drivers. Display 26 projects display message 32 "Baby on Board" in yellow text when child 40 is present in child car seat 12. External sensor 28 is mounted to bumper 34 of vehicle 42. Further, external sensor 28 comprises a speedometer 36 and capacitive displacement sensor 38, wherein speedometer 36 detects when an adjacent vehicle exceeds a specified speed limit (e.g., the speed limit of the road on which the vehicles are being operated, or a speed more than 5 mph greater than the speed of vehicle 42) and wherein capacitive displacement sensor 38 detects when another vehicle is within three seconds of contacting vehicle 42 containing system 10 at the current speed. When another vehicle either exceeds the posted speed limit or falls below a minimum separation distance from vehicle 42 containing system 10, the display message 32 "Baby on Board" on the at least one display 26 changes color from yellow to red.

Figure 2:
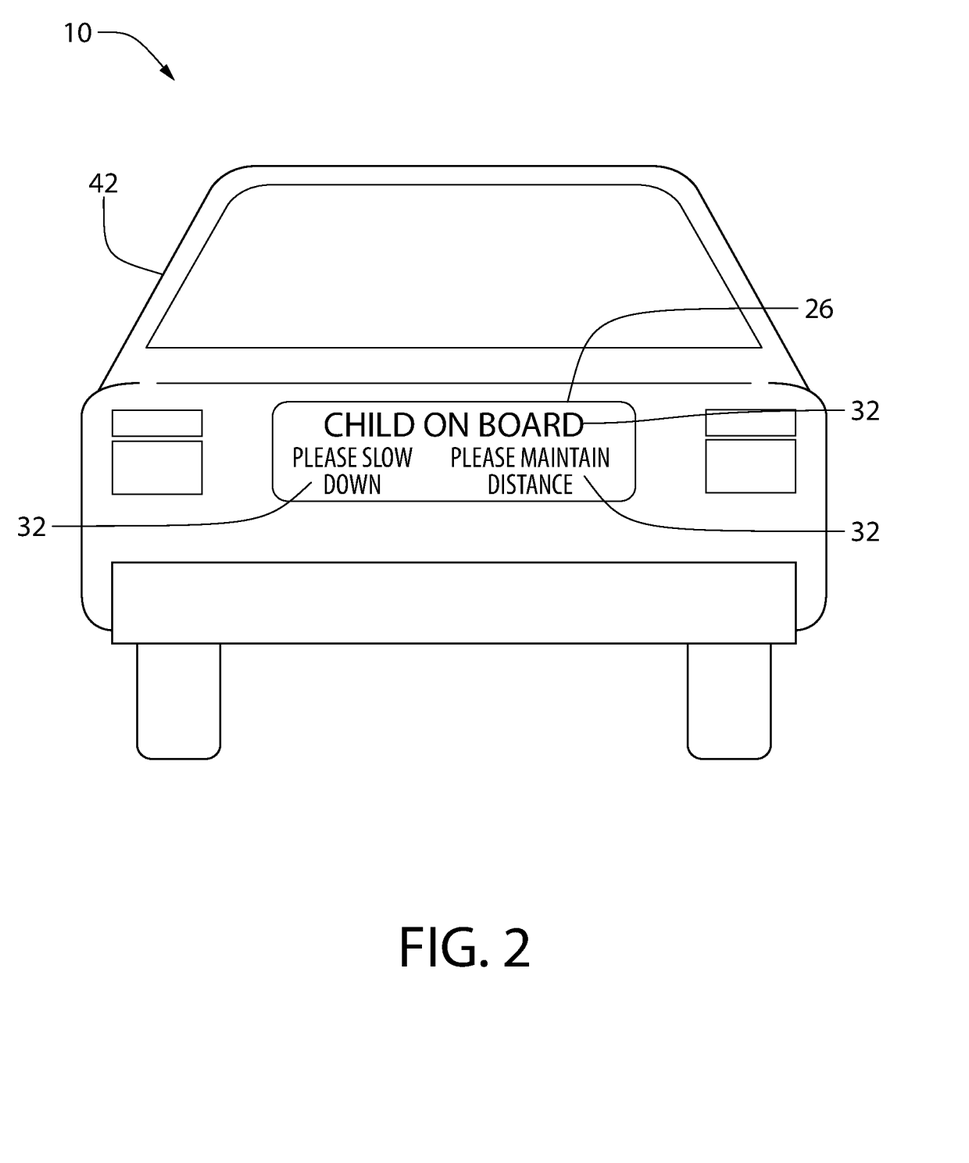
FIG. 2 is a schematic rear view of a vehicle in which an embodiment of the system of the invention is installed.

FIG. 2 illustrates an additional embodiment of display 26, wherein display 26 is mounted externally on vehicle 42. Display 26 projects display message 32 "Child on Board" in illuminated text. Display 26 also projects additional display messages 32, "Please Slow Down" and "Please Maintain Distance" wherein the "Please Slow Down" display message 32 is illuminated when an adjacent vehicle exceeds a specific speed threshold and the "Please Maintain Distance" display message 32 is illuminated when an adjacent vehicle falls below a minimum separation distance from vehicle 42 containing system 10.

Figure 3:
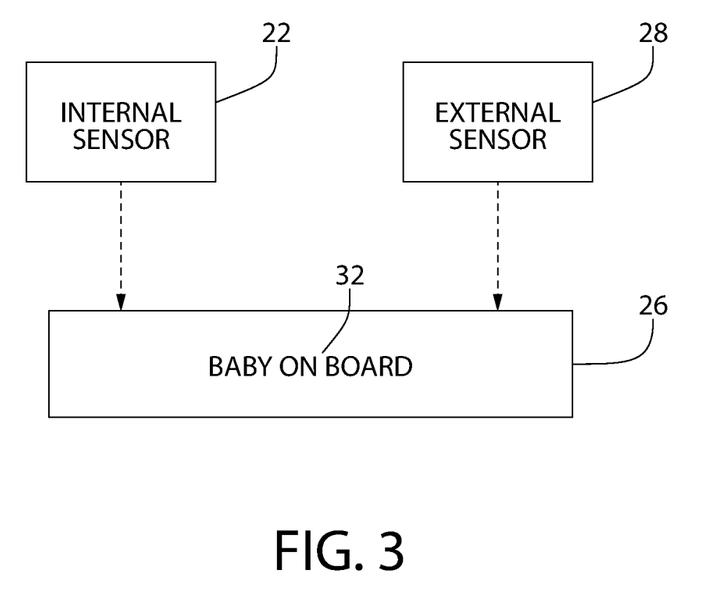
FIG. 3 is a block diagram illustrating an embodiment of a connection of the car seat sensor and external sensor to the at least one external display.

FIG. 3 is a block diagram illustrating a non-limiting example of the connection of internal sensor 22 and external sensor 28 to display 26. internal sensor 22, upon detecting the presence of a child, is configured to send input to display 26. In correspondence, display 26 notifies nearby drivers that a child is on board by displaying a visual display message 32. External sensor 28, upon detecting that an adjacent vehicle is exceeding a speed threshold, is configured to send input to display 26, effecting a change in display 26 through its display message 32. External sensor 28, upon also detecting that an adjacent vehicle has fallen below a minimum separation distance, sends input to display 26, also effecting a change in display 26 through its display message 32.

Figure 4:
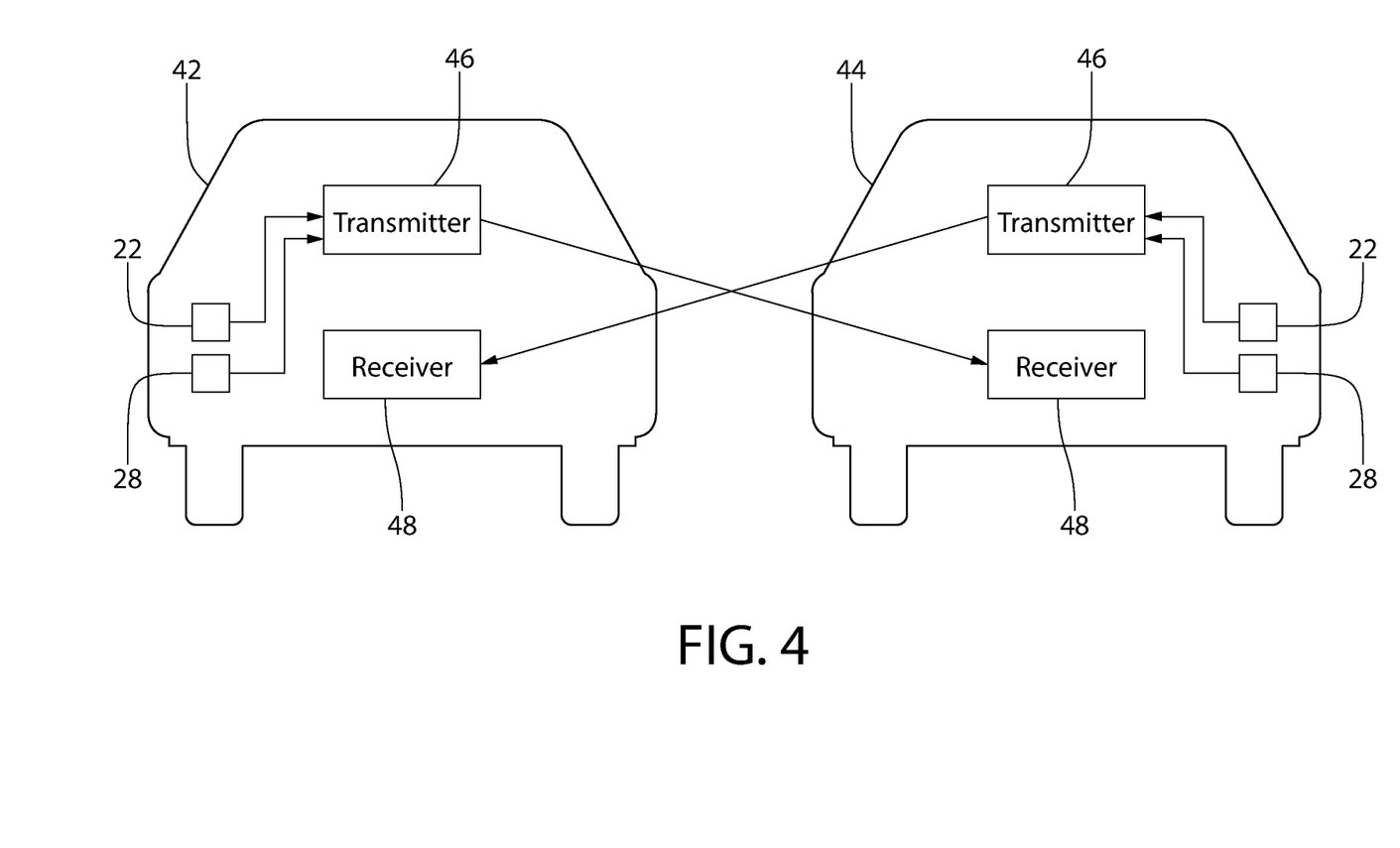
FIG. 4 is a schematic rear view of a vehicle in which an embodiment of the system of the invention is installed.

FIG. 4 is a block diagram illustrating a non-limiting example of the connection between transmitter 46 and receiver 48 of the system. Upon transmitter 46 receiving information from internal sensor 22 and/or external sensor 28, transmitter 46 located in first vehicle 42 conveys information to receiver 48 located in second vehicle 44. Receiver 48 is then able to convey information to second vehicle 44 that first vehicle 42 is experiencing a change that meets a specified standard, including but not limited to suddenly slowing down, stopping, or becoming involved in an accident. In a preferred embodiment, multiple vehicles may be equipped with both transmitters 46 and receivers 48 permitting each vehicle to communicate with one another in a local network to best enhance a driver's awareness of their vehicle's surroundings. Each transmitter 46 and receiver 48 may be removably attached to a vehicle to allow for installation in an existing vehicle or may be embedded permanently into a vehicle.

While the invention has been described in detail and with reference to specific examples thereof, it will be apparent to one skilled in the art that various changes and modifications can be made therein without departing from the spirit and scope thereof

What is claimed is:

1. A method for detecting and reporting occupant and operational status of a first vehicle, said method comprising the steps of:
    detecting, by an internal sensor of the first vehicle, a presence of at least one first occupant within the first vehicle;
    classifying, by the internal sensor, the at least one first occupant in at least one classification;
    communicating, by the internal sensor, a signal to an accessory display that is mounted to the first vehicle such that a screen of the accessory display faces in a direction pointing away from the first vehicle, wherein the screen is not visible by the at least one first occupant of the first vehicle and is visible by persons located outside of the first vehicle and or a perception system of another vehicle;
performing the following operations while the first vehicle is driving:
    presenting on the screen a first electronic message reporting the at least one classification to at least one of said persons located outside the first vehicle and/or to at least one second occupant of another second vehicle;
    detecting, by an external sensor coupled to the first vehicle, at least one condition of an environment surrounding the first vehicle;
    selecting, by the external sensor, a standard from a plurality of standards based on at least the classification, wherein the plurality of standards comprise an adjacent vehicle falling below a minimum separation distance from the first vehicle, and or an adjacent vehicle exceeding a specified speed threshold;
    determining, by the external sensor, whether the standard is met based on the at least one condition of the environment; and
responsive to the standard being met, performing the following operations:
    controlling operations of the first vehicle to change a driving pattern thereof; and
    controlling operations of the accessory display to (i) modify a visual feature of the first electronic message being presented on the screen, and/or (ii) add a different second electronic message to the screen whereby the first and second electronic messages are concurrently presented so as to both be visible by persons located outside the first vehicle and or by the perception system of the another second vehicle.

2. The method of claim 1, wherein the at least one classification is selected from the group consisting of a disabled human, an elderly human of at least 65 years of age, and a human child of less than 5 years of age.

3. The method of claim 1, wherein the classifying step comprises determining with the internal sensor that a seat in the first vehicle is occupied.

4. The method of claim 3, wherein the internal sensor is electrically coupled to the first vehicle.

5. The method of claim 1, wherein the internal sensor is electrically coupled to a child car seat.

6. The method of claim 1, further comprising:
    detecting driving behavior with the internal sensor,
    reporting information from the internal sensor to a transmitter located in the first vehicle, and
    communicating the information from the transmitter located in the first vehicle to a receiver located in the second vehicle.

7. The method of claim 6, wherein the receiver activates an internal display in the second vehicle and/or adjusts the mechanical function of the second vehicle.

8. The method of claim 6, wherein the second vehicle is selected from the group consisting of a manually operated vehicle, semi-autonomous vehicle, or self-driving vehicle.

9. A system for detecting and reporting occupant and operational status of a first vehicle, said system comprising:
    an occupant detector configured to detect a presence of at least one first occupant within the first vehicle and classify the at least one first occupant in at least one classification;
    at least one external sensor coupled to the first vehicle and configured to detect at least one condition of an environment surrounding the first vehicle, select a standard from a plurality of standards based on at least the classification, and determine whether the standard is met based on the at least one condition of the environment, wherein the plurality of standards comprise an adjacent vehicle falling below a minimum separation distance from the first vehicle, and or an adjacent vehicle exceeding a specified speed threshold; and
    at least one accessory display device mounted to the first vehicle such that a screen of the accessory display device faces in a direction pointing away from the vehicle, wherein the screen is not visible by the at least one first occupant of the first vehicle and is visible by persons located outside of the first vehicle;
    wherein a first electronic message is presented on the screen which reports the at least one classification to at least one said persons located outside the first vehicle and/or to at least one second occupant of another second vehicle;

wherein the system is configured to perform the following operations when the first vehicle is driving and the standard is met:
  control operations of the first vehicle to change a driving pattern thereof; and
  control operations of the display to (i) modify a visual feature of the first electronic message being presented on the screen, and/or (ii) add a different second electronic message to the screen whereby the first and second electronic messages are concurrently presented.

10. The system of claim 9, wherein the system is configured to permit a user to manually enter occupant information.

11. The system of claim 9, wherein the occupant detector comprises at least one internal sensor.

12. The system of claim 11, wherein the at least one internal sensor comprises at least one of a pressure sensor, a movement sensor, an infrared sensor, a sound detection device, a facial recognition sensor, an iris recognition sensor, and a fingerprint sensor.

13. The system of claim 9, wherein the at least one external sensor comprises at least one of a thermometer, a barometer, a wind sensor, a speedometer, an accelerometer, a magnetometer, a capacitive displacement sensor, a radar sensor, a Doppler effect sensor and a Hall-effect sensor.

14. The system of claim 9, wherein the at least one accessory display device comprises at least one of a head-up display, bulb lighting, an electroluminescent (ELD) display, a liquid crystal (LCD) display, a light-emitting diode (LED) display, a quantum dot (QLED) display, an OLED display, a thin-film transistor display (TFT), a segment display, a laser display, and a digital light processing display.

15. The system of claim 9, wherein the visual feature of the first electronic message comprises an illumination density or a color.

16. The system of claim 9, further comprising a transmitter and a receiver, wherein the transmitter communicates information to the receiver regarding at least one of an occupant status, vehicle operation status, weather conditions, traffic patterns, vehicle location, vehicle speed, and roadway hazards.

* * * * *